(12) United States Patent
Scherzinger et al.

(10) Patent No.: US 7,850,532 B2
(45) Date of Patent: Dec. 14, 2010

(54) AXIAL IMPACT SHAFT SYSTEM

(75) Inventors: William Scherzinger, Oro Valley, AZ (US); Wayne T. Pearson, Oro Valley, AZ (US); Simon L. Waddell, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 480 days.

(21) Appl. No.: 11/944,945

(22) Filed: Nov. 26, 2007

(65) Prior Publication Data

US 2009/0137324 A1    May 28, 2009

(51) Int. Cl.
*F16D 1/027* (2006.01)

(52) U.S. Cl. .......................... 464/182; 464/32

(58) Field of Classification Search ............... 464/32, 464/162, 182, 183; 310/75 D
See application file for complete search history.

(56) References Cited

U.S. PATENT DOCUMENTS

| | | | |
|---|---|---|---|
| 3,396,592 A | 8/1968 | French | |
| 3,742,264 A | 6/1973 | Anderson et al. | |
| 4,560,364 A | 12/1985 | Cohen | |
| 7,025,686 B1 * | 4/2006 | Aiken | 464/162 |
| 2004/0152528 A1 * | 8/2004 | Okude et al. | 464/182 |

FOREIGN PATENT DOCUMENTS

| | | | |
|---|---|---|---|
| GB | 884523 A | 12/1961 | |
| GB | 1163834 A | 9/1969 | |

OTHER PUBLICATIONS

European Search Report dated Jun. 19, 2009.

* cited by examiner

*Primary Examiner*—Greg Binda
(74) *Attorney, Agent, or Firm*—Oral Caglar, Esq.

(57) ABSTRACT

A stub shaft of a main rotor shaft of a generator has its flange or shoulder removed from its outer portion so in the event of a bending failure of the stub shaft the resulting axial load of the stub shaft is not transmitted to the main rotor shaft. Instead of a retention plug adjacent the distal end of the inside portion of the stub shaft, a knock out plug is lightly press-fit into the main rotor shaft. In the event of a failure, the outside portion of the stub shaft enters the main rotor shaft without applying an axial load onto the main rotor shaft, moves axially and displaces the knock-out plug without exiting the main rotor shaft.

10 Claims, 5 Drawing Sheets

AXIAL IMPACT SHAFT SYSTEM

BACKGROUND OF THE INVENTION

The present invention generally relates to apparatus and methods for limiting damage to generators, other rotating machines and associated driving devices and prime movers such as gearboxes and engines and, more particularly, to apparatus and methods of limiting damage initiated by a bending failure of a stub shaft affixed to the main rotor shaft.

Rotating machines, such as aircraft generators, often have a stub shaft which interfaces between the main rotor shaft of the generator and the prime mover gearbox. The stub shafts are coupled to the main engine or to auxiliary power units through the gear box. If the main rotor shaft is or becomes misaligned, for example from a ball bearing failure, a bending type failure of the stub shaft may occur. This means that the stub shaft breaks apart but not smoothly at a line perpendicular to a length of the stub shaft but rather the break may be along an incline such as a 45° incline.

When the bending failure of the stub shaft develops and the stub shaft breaks at an inclined surface, since the two parts of the broken stub shaft attempt to turn at different speeds, an axial load is imparted toward the main rotor shaft and gearbox shaft. Typically the stub shaft has a flange proximal to the end of the main rotor shaft. The reason for the presence of this flange is to limit movement of the stub shaft. Accordingly if the stub shaft is axially constrained in the gearbox output shaft, the axial load resulting from the initial bending failure is transmitted via the flange to the main rotor shaft from the proximal end of the main rotor shaft throughout the main rotor shaft to its distal end and then to the housing of the rotating machine. The housing of the generator may be vulnerable to breakage since it is often comprised of a first portion and an end bell portion bolted together nearer the distal end of the main rotor shaft. A broken generator housing would cause further damage to the generator potentially resulting in an uncontained failure and significant consequential damage to adjacent equipment.

A second problem from the bending failure of the stub shaft is that the main rotor shaft may keep turning. This might create excessive vibration and consequential damage to adjacent equipment.

As can be seen, there is a need for an improved assembly or system that limits or contains any potential damage to from a bending type failure of the stub shaft.

SUMMARY OF THE INVENTION

In one aspect of the present invention, there is presented a failure relief assembly, comprising a main rotor shaft of a rotating machine, a stub shaft having an inside portion situated inside the main rotor shaft and an outside portion projecting outside the main rotor shaft, and a knock-out plug inside the main rotor shaft and facing a distal end of an inside portion of the stub shaft, the knock-out plug press fit into the main rotor shaft lightly enough that when a broken part of the stub shaft moves axially through the main rotor shaft the broken part of the stub shaft displaces the knock-out plug without the knock-out plug or the broken part exiting the main rotor shaft.

In a further aspect of the invention, there is presented a method of limiting damage to a rotating machine, the method comprising placing a stub shaft into a main rotor shaft of the rotating machine so that a portion of the stub shaft without a flange remains outside the main rotor shaft; press-fitting a knock-out plug inside the main rotor shaft facing a distal end of the stub shaft; and limiting damage to the rotating machine in the event of a bending failure of the stub shaft, by allowing at least part of the outside portion of the stub shaft to enter the main rotor shaft; and by laterally displacing the knock-out plug without the at least part of the outside portion of the stub shaft exiting the main rotor shaft.

In another aspect of the invention, there is presented a failure relief assembly for a generator, comprising a stub shaft affixed to a main rotor shaft of the generator, a portion of the stub shaft remaining outside the main rotor shaft but capable of entering the main rotor shaft; and a knock-out plug inside the main rotor shaft adjacent the inside portion of the stub shaft, the knock-out plug capable of allowing axial movement of at least part of the stub shaft within the main rotor shaft.

These and other features, aspects and advantages of the present invention will become better understood with reference to the following drawings, descriptions and claims.

DETAILED DESCRIPTION OF THE INVENTION

Figure 1:
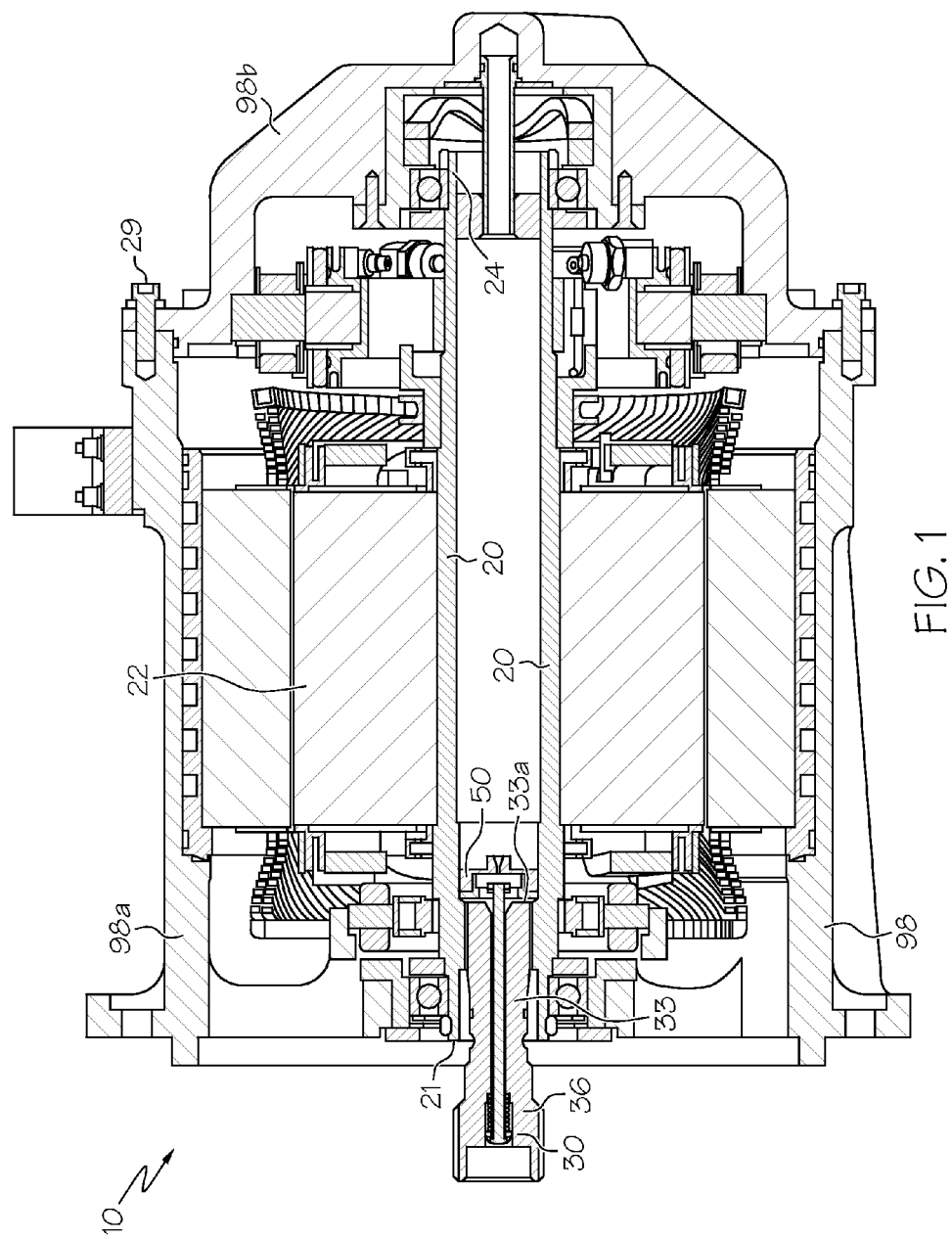
FIG. 1 is a sectional view of the axial impact shaft system according to one embodiment of the present invention in the environment of a generator.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a stub shaft failure relief assembly, also called an axial impact shaft system, for a rotating machine, such as an aircraft generator, a high speed generator or a generator in a ground vehicle. Typically the main rotor shaft of the generator may be rotating and operatively engaged to the drive shaft of the gear box. As opposed to torsion failures, bending type failure of a stub shaft connected to a main rotor shaft of a rotating machine tends to cause an axial load against the main rotor shaft. The axial impact shaft system of the present invention may prevent an axial load from being transmitted to the main rotor shaft and to the housing of the generator. Instead, the stub shaft enters the main rotor shaft and displaces a knock-out plug. The stub shaft may travel a short distance, such as three-quarters of an inch in one example of the present invention, inside the main rotor shaft relieving the axial load and thereby preventing damage to the stub shaft from affecting the main rotor shaft, the generator housing or other components of the generator.

In contrast to the prior art, which uses a stub shaft having one or more flanges on an outer surface of the part of the stub shaft sticking out of the main rotor shaft, the stub shaft of the present invention utilizes an outside portion which may not have a flange or shoulder projecting from its outer surface. Consequently, the outside portion of the stub shaft is free to enter the main rotor shaft in the event of a bending failure of the stub shaft. In addition, in contrast to the prior art which utilizes a retention plug adjacent the distal end of the stub shaft inside the main rotor shaft (or else utilizes a piece of steel inside the main rotor shaft integrally connected to the main rotor shaft and having a small hole therethrough), the assembly of the present invention uses a knock-out plug inside the main rotor shaft. In further contrast to the prior art, wherein the retention plug is firmly press-fit into the main rotor shaft and hence is stationary, the knock-out plug is only lightly press-fitted into the main rotor shaft and can be displaced by a stub shaft moving axially inside the main rotor shaft. For example, a retention plug of the prior art may be press-fit across a larger distance of the main rotor shaft than half an inch whereas the knock-out plug of the present invention may be press-fit across approximately one-half inch of main rotor shaft. Finally, in further contrast to the prior art, wherein axial load resulting from a bending failure of the stub shaft is liable to be transmitted to the housing of the rotating machine, the assembly of the present invention prevents transmission of any axial load from the broken stub shaft onto the housing of the rotating machine.

As seen from FIG. 1, a bending failure relief assembly 10 may include a main rotor shaft 20 of a rotating machine 22 and a stub shaft 30 having an inside portion 33, defined as the portion of stub shaft 30 that is situated inside main rotor shaft 20, and an outside portion 36, defined as the portion of stub shaft 30 that is projecting outside main rotor shaft 20. A proximal end of outside portion 36 of stub shaft 30 may be operatively engaged to a gear box drive shaft of a gear box or to another accessory or associated driving device of the rotating machine.

As seen from FIG. 1, housing 98 of rotating machine 22 may be formed of two portions, a first portion 98a and a second portion 98b (end bell portion 98b), that are affixed to one another, for example via bolts 29, but are not integrally connected to one another. Therefore, if there was a strong axial force against main rotor shaft 20 which may be transmitted to housing 98, bolts 29 may fail and rotating machine housing 98 break into two or more portions (e.g. 98a, 98b).

Figure 2:
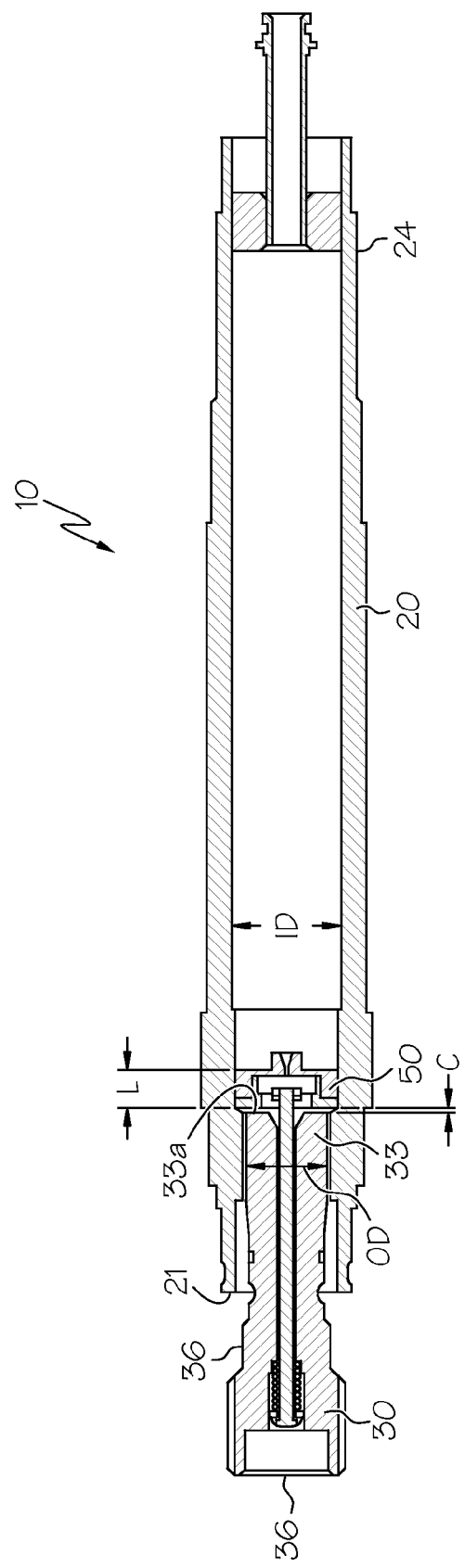
FIG. 2 is a sectional view of an assembly of the present invention.

As seen from FIG. 2, outside portion 36 may have no flange or shoulder limiting movement of outside portion 36, or a portion of outside portion 36, into main rotor shaft 20. Consequently, outside portion 36 (or at the very least a continuous part of outside portion 36 that is closest to exterior proximal end 21 of main rotor shaft 20) may have an outer diameter OD equal to or slightly less than the inner diameter ID of main rotor shaft 20 and is capable of entering main rotor shaft 20 when an axial force is exerted on stub shaft 30 (or on a part of stub shaft 30 closest main rotor shaft 20).

Figure 4:
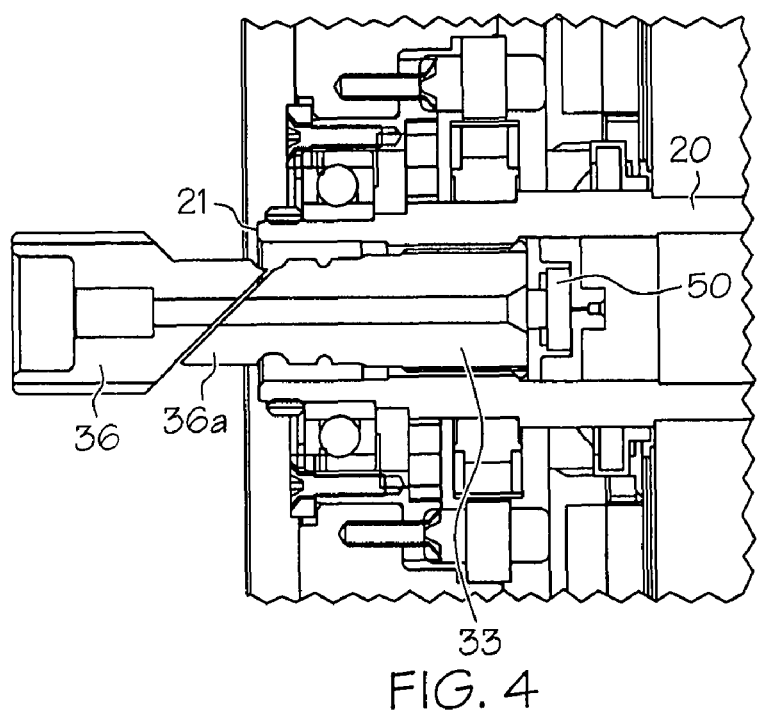
FIG. 4 is a sectional view of the system of FIG. 1 with the two portions of the stub shaft beginning to move apart.
Figure 5:
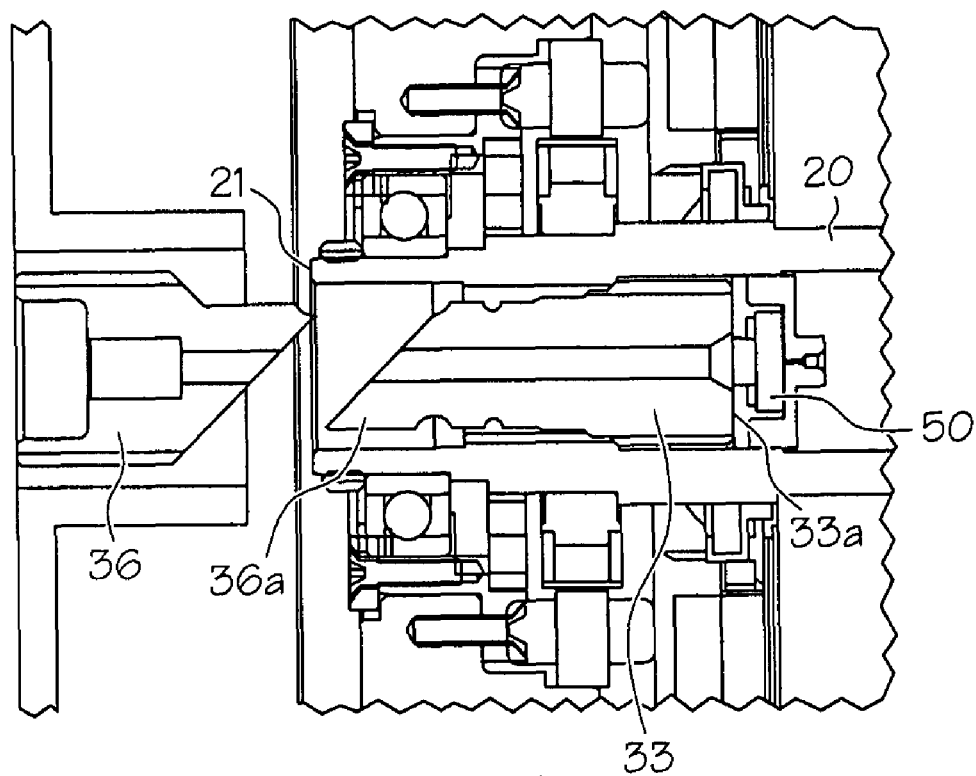
FIG. 5 is a sectional view of the system of FIG. 1 wherein the stub shaft has displaced the knock-out plug.
Figure 6:
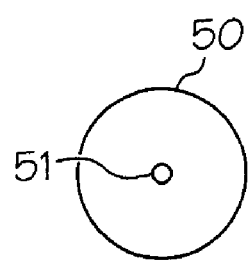
FIG. 6 is an end view of a knock out plug used in the assembly of the present invention.

As seen from FIGS. 4-5, after a bending failure of stub shaft 30, the broken part 36a of outside portion 36 (i.e. the part situated to the right of the 45 degree break as seen from FIGS. 4-5) is capable of entering main rotor shaft 20 without pushing against exterior proximal end 21 of main rotor shaft 20. Although a certain amount of axial force may be exerted against the inside walls of main rotor shaft 20 by the broken part 36a of outside portion 36 of stub shaft 30 entering and sliding through main rotor shaft 20, no axial force, and certainly no significant axial force, may be transmitted to exterior proximal end 21 (see FIG. 5) of main rotor shaft 20.

Since the reason the present invention utilizes a stub shaft 30 without a flange on outer portion 36 is to avoid transmission of an axial force to main rotor shaft 20 and then to housing 98, a shearable flange or a minimal flange projecting from outside portion 36 that does not produce an axial force against exterior proximal end 21 of main rotor shaft 20 or against housing 98 significant enough to damage housing 98 in the event outside portion 36 of stub shaft 30 enters main rotor shaft 20, may be acceptable. Purely by way of example, if a flange produced an axial force against the main rotor shaft of less than 80 pounds, this force may not be significant enough to damage main rotor shaft 20 or housing 98 of rotating machine 22 if rotating machine 22 is a generator and there was already a pre-load of approximately 80 pounds in the bearings.

As shown in FIG. 2, assembly 10 may also include a knock-out plug 50 located inside main rotor shaft 20 and facing a distal end 33a of inside portion 33 of stub shaft 30. Knock-out plug 50 may be adjacent distal end 33a of inside portion 33 of stub shaft 30. For example, there may be a clearance (C) of approximately one tenth of an inch between knock-out plug 50 and stub shaft 30. Knock-out plug 50 may be press fit into main rotor shaft 20. As seen from FIG. 4, knock-out plug 50 may be shaped like a disk that is substantially round.

The press fit or interference fit of knock-out plug 50 into main rotor shaft 20 may be accomplished by a number of ways known to those skilled in the art. For example, main rotor shaft 20 may be heated and enlarged. While main rotor shaft 20 is hot and enlarged, knock-out plug 50 may be inserted by sliding knock-out plug 50 through main rotor shaft 20 from a distal end 24 of main rotor shaft 20, in a right to left direction by reference to the view shown in FIG. 1. As an example, knock-out plug 50 may be press fit into main rotor shaft 50 with a force of approximately 100 pounds. Furthermore, knock-out plug 50 may be press-fit into main rotor shaft 20 across a distance (L) of only approximately half an inch in order to limit the force of the press-fit. As a result, knock-out plug 50 may be press-fit lightly enough that knock-out plug 50 may not be stationary but rather may be displaced to the right (toward distal end 24 of main rotor shaft 20) when the stub shaft 30 moves axially through main rotor shaft 20 (see FIG. 5) in the event of a bending type failure in stub shaft 30.

While knock-out plug 50 may be press-fit weakly enough that it can be displaced by a moving stub shaft 30, knock-out plug 50 may still be press-fit at least tightly enough to hold stub shaft 30 in place and not allow stub shaft 30 to disengage from the gear box (not shown) that stub shaft 30 is operatively attached. The force necessary to ensure that knock-out plug 50 holds stub shaft 30 in place is not very significant (for example, approximately 100 pounds may be sufficient) since, barring any bending or other failure and assuming the components of the rotating machine (and any connected accessories) are working properly, there may not be an axial force from stub shaft 30 pressing against knock-out plug 50.

In addition, as with the retention plug of the prior art, knock-out plug 50 may have an aperture 51 running through knock-out plug 50 that allows a limited amount of a lubricant, such as oil, to pass through knock-out plug 50 and thereby lubricate the splines between inside portion 33 of stub shaft 30 and main rotor shaft 20. Accordingly, prior to any bending failure of stub shaft 30, knock-out plug 50 may function similarly to a retention plug of the prior art.

Figure 3:
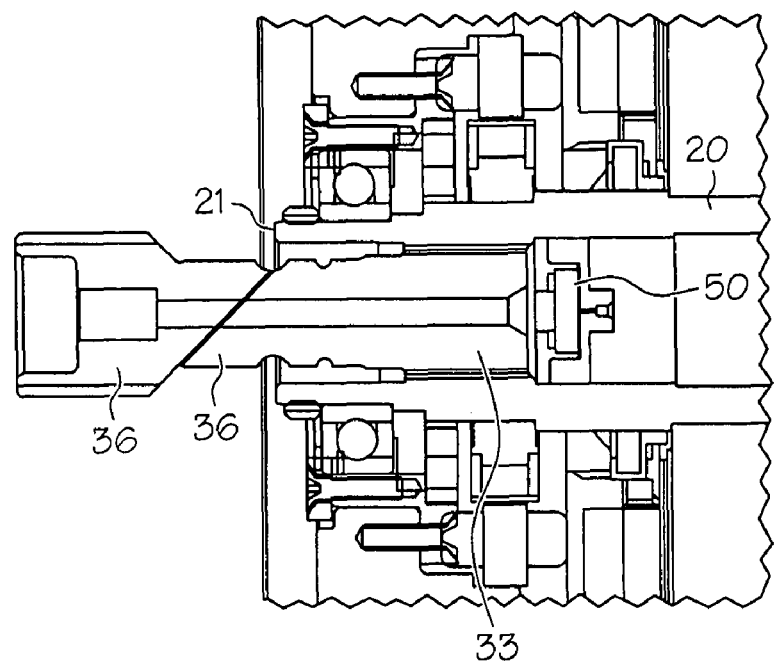
FIG. 3 is a sectional view of the system of FIG. 1 upon a 45° bending failure of the stub shaft.

FIG. 3 shows how a bending type failure in stub shaft 30 begins from a crack that may be configured across a line at a 45° angle to the length of stub shaft 30. In FIG. 4, the crack becomes a break and the two broken portions of stub shaft 30 may be driven apart with the splines separating. The two broken portions of the stub shaft 30 may be driven apart because the broken portion closer to the gearbox may be still driven by the gearbox while the broken portion closer to main rotor shaft 20 is opposing this driving torque due to its operational loading. The 45 degree angle break of the stub shaft may then act as a ramp due to the relative rotation difference between the two parts of the stub shaft, resulting in axial force and movement.

As seen from FIG. 5, with the bending failure of stub shaft 30, the broken portions of stub shaft 30 move away from each other and the broken portion of stub shaft 30 that is closer to main rotor shaft 20 may move a certain distance laterally (i.e. axially) toward the distal end of main rotor shaft 20 and in so doing may displace adjacent knock-out plug 50 laterally (i.e. axially) by this approximately amount without causing knock-out plug 50 to exit main rotor shaft 20. This lateral distance that the broken portion of stub shaft 30 closer to main rotor shaft 20 moves, may be, in one example of the present invention, approximately three-quarters of an inch. Since knock-out plug 50 may not exit main rotor shaft 20, then it stands to reason stub shaft 30, which is further from the distal end of main rotor shaft 20 than knock-out plug 50, may also not be expelled from main rotor shaft 20. Since outside portion 36 has no flange or other projection that would abut an exterior proximal end 21 of main rotor shaft 20, there may be no axial load transmitted to housing 98 from stub shaft 30 after the bending failure of stub shaft 30 from movement of outside portion 36. Furthermore, main rotor shaft 20 may stop rotating in the event of the bending failure since the portion of stub shaft 30 that is connected to main rotor shaft 20 is no longer rotating.

Depending upon the strength of the force directing movement of outside portion 36 of stub shaft 30, it may be that only a portion of outside portion 36 will actually enter main rotor shaft 20 and displace knock-out plug 50. Moreover, notwithstanding FIG. 5, it may be that not all of broken part 36a of outside portion 36 will actually enter main rotor shaft 20 after the failure.

Figure 7:
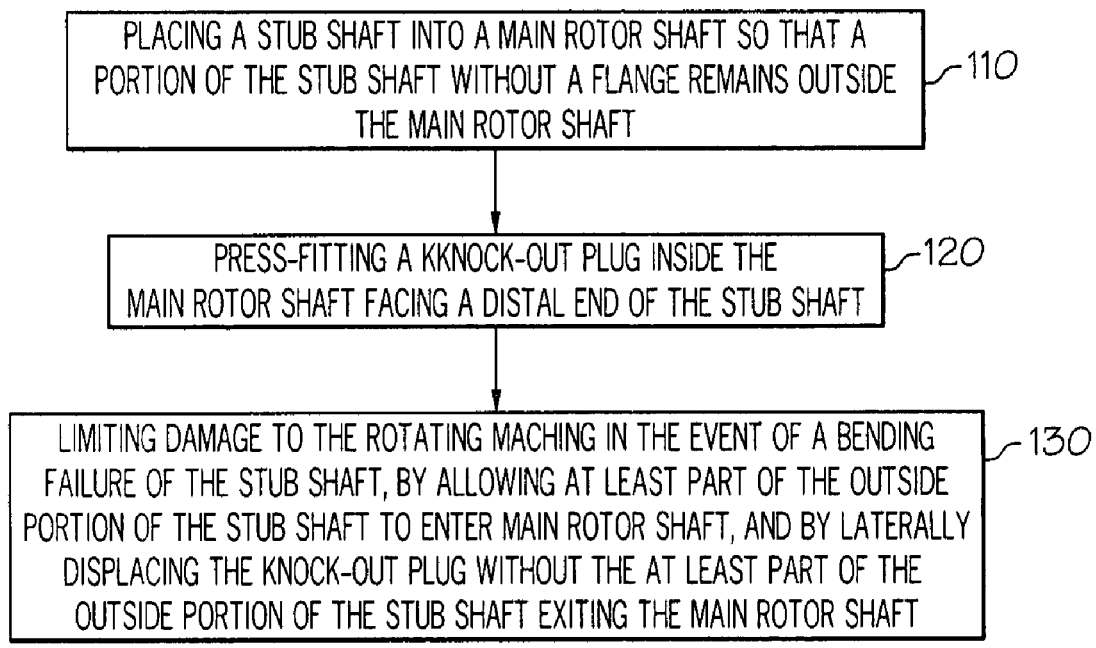
FIG. 7 is a flow chart showing a method of the present invention.

As seen from FIG. 7, the present invention may also be expressed as a method of limiting damage to a rotating machine, such as a generator. In accordance with such a method 100, in step 110, stub shaft 30 may be placed into main rotor shaft 20 of a rotating machine so that a portion of stub shaft 30 that does not have a flange remains outside main rotor shaft 20. In accordance with method 100, in step 120, knock-out plug 50 may be press-fit inside main rotor shaft 20 so that knock-out plug 50 may face a distal end of stub shaft 30. In order to accomplish this step 120, knock-out plug 50 may be inserted into or slid into the distal end 24 of main rotor shaft 20 and this may be accomplished before stub shaft 30 has been placed into main rotor shaft 20.

A further step 130 of method 100 may involve limiting damage to the rotating machine in the event of a bending failure of stub shaft 30, by allowing at least a portion of outside portion 36 of stub shaft 30 to enter main rotor shaft 20 and by laterally displacing knock-out plug 50 without the portion of outside portion 36 of stub shaft 30 exiting main rotor shaft 20.

It should be understood, of course, that the foregoing relates to exemplary embodiments of the invention and that modifications may be made without departing from the spirit and scope of the invention as set forth in the following claims.

We claim:

1. A generator, comprising:
   a main rotor shaft supported within a housing of the generator,
   a stub shaft having an inside portion situated inside the main rotor shaft and an outside portion projecting outside the main rotor shaft;
   the stub shaft being vulnerable to failure in a mode in which the inside portion and the outside portion separate from one another so that the separated internal portion may be driven axially into the main rotor shaft;
   the stub shaft having a splined engagement with the main rotor shaft:
   a plug for retention of a lubricant;
   the plug having an aperture therethrough for passage of limited amount of the lubricant so that the splined engagement is lubricated; and
   the plug being positioned inside the main rotor shaft and facing a distal end of the inside portion of the stub shaft, the plug press fit into the main rotor shaft lightly enough that when the separated internal portion of the stub shaft moves axially through the main rotor shaft to displace the plug.

2. The generator of claim 1, wherein the rotating machine is a generator.

3. The generator of claim 1, wherein the outside portion of the stub shaft has no flange.

4. The generator of claim 1, wherein the plug is press-fit with a force of approximately 100 pounds.

5. The generator of claim 1, wherein the plug has an axial length (L) of approximately one-half inch or less.

6. The generator of claim 1, wherein the stub shaft is operatively engaged to an accessory of the rotating machine.

7. A shaft assembly for a generator, comprising:
   a stub shaft in splined engagement with a main rotor shaft of the generator, a portion of the stub shaft remaining outside the main rotor shaft and a portion of the stub shaft being within the main rotor shaft the main rotor shaft;
   a knock-out plug inside the main rotor shaft;
   the knock-out plug capable of retaining lubricant within the main rotor shaft while releasing a limited portion of the lubricant for lubrication of the the splined engagement; and
   the knock-out plug allowing axial movement of the portion of the stub shaft within the main rotor shaft away from the portion of the stub shaft remaining outside the main rotor shaft in the event of separation of the stub shaft as a result of generator failure; and
   the knock-out plug being a round disk and being capable of axial movement in the main rotor shaft without producing radial distortion of the main rotor shaft.

8. The assembly of claim 7, wherein there is a clearance of approximately one tenth of an inch between the knock-out plug and the stub shaft.

9. The assembly of claim 7, wherein the stub shaft is connected to a gear box.

10. The assembly of claim 7, wherein the generator has a housing having a first portion and a second portion, the first and second portions affixed together but not integrally connected.

* * * * *